May 9, 1967  A. R. HURST  3,318,748

METHOD OF FORMING A LAMINATE PAPER PLATE

Filed April 24, 1963

INVENTOR.
Alan R. Hurst,
BY
Hofgren, Wegner, Allen,
Stellman & McCord Attys.

United States Patent Office 3,318,748
Patented May 9, 1967

3,318,748
METHOD OF FORMING A LAMINATE PAPER PLATE
Alan R. Hurst, Hinsdale, Ill., assignor, by mesne assignments, to Morton Salt Company, Chicago, Ill., a corporation of Delaware
Filed Apr. 24, 1963, Ser. No. 275,391
14 Claims. (Cl. 156—224)

This invention relates to laminate provided by heat sealing one layer to another, and more particularly, to formed laminate articles such as plastic-paper laminate containers, e.g., "paper plates," and their manufacture.

It is a general object of this invention to provide a new and useful article and method as herein described.

In one aspect it is an object of this invention to provide a new and useful method of making plastic-paper laminated dishes and the like.

A further object of this invention is to provide new and useful plates and the like produced by cutting the plate from a plurality of webs, e.g., two webs, generally while heat sealing the webs together at least at the periphery of the paper plate or plate blank.

Another object is to provide a method which involves heat sealing a web of plastic film to a web of paper while cutting an object configuration from the two webs in generally one operation, and thereafter forming the desired article from the cut configuration with or without further heat sealing.

Yet another object of this invention is to provide a method in accordance with any of the foregoing objects wherein the web, e.g., paper and plastic film, trimmings are readily recoverable as separate by-products.

Still another object is to provide a method wherein the plurality of webs are heat sealed within the periphery of the article to be cut out, e.g., as a band heat seal along the periphery or as a total area heat seal over the entire area of the article to be cut out, and the webs are then cut in registry with the heat seal at about the periphery of the heat sealed portion to produce the desired article or blank configuration while permitting recovery of trimmings from each web exteriorly of the periphery as separated by-products.

In another aspect, it is an object of this invention to provide new and useful plastic paper laminated dishes or containers which may be produced by a method in accordance with any of the foregoing objects.

In recent years with the development of improved coatings and plastic film materials, it has become common practice to apply such coatings or films to the surface of paper containers which is to come into contact with liquids, semi-solids, or other materials to be contained. For example, in the production of paper plates, a laminate of paper and plastic film may be used and the plate blanks may be cut from the laminate and thereafter formed to the desired paper plate configuration. Another method for producing such containers has been to form separate paper, or other fibrous material, and plastic portions and join the separate formed portions by heat sealing. The former process involving the prelaminated stock from which plate blanks are cut has the advantage of simplicity in equipment and eliminates the necessity of having to register two preformed elements, as is required in the second mentioned method. In the method using the prelaminated stock, a roll of laminated stock material may be unwound and charged through a cutting die which cuts the plate blanks. The plate blanks are then fed to a forming die which forms them into plate configuration. However, in such process the trim stock, i.e., that stock which is cut from around the blanks when the blanks are cut from the sheet, is a laminate of plastic and paper. Although such laminate has some recovery value, it has much less value than if the paper and plastic trimmings could be recovered as separate by-products. It is an advantage of the present method in production of the blanks and paper plates of this invention that the trimmings can be recovered if desired as separate by-products, and that the product plate is a new and useful product, which may be recovered separate from the trimmings.

Other objects and advantages of this invention will be apparent from the following descriptions, especially with reference to the drawing in which.

Figure 1:
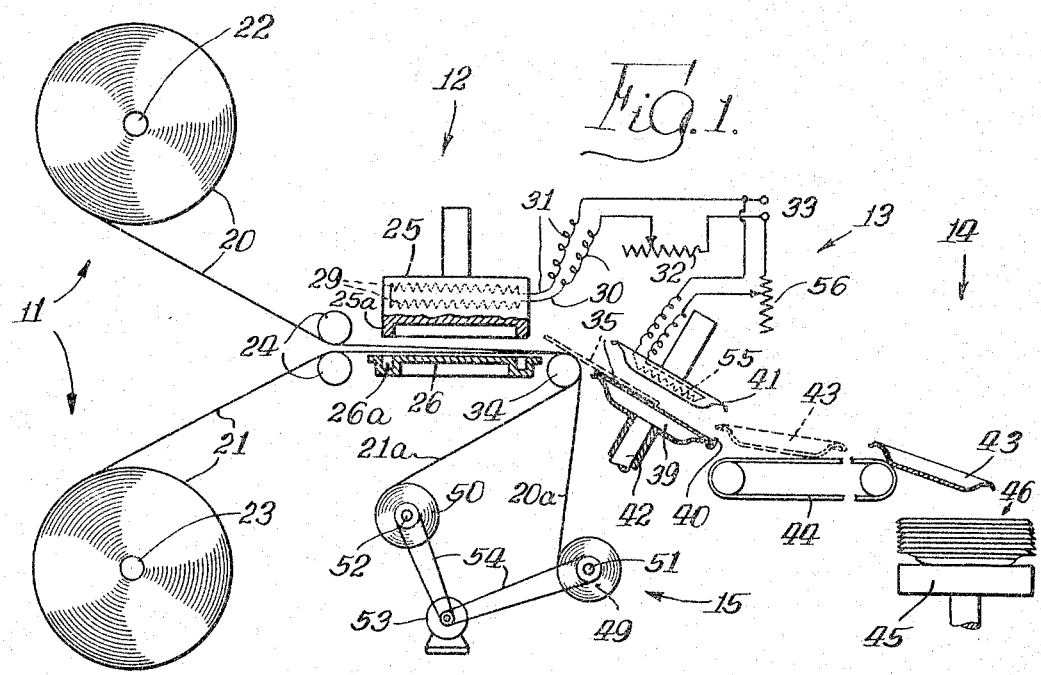
FIGURE 1 is a schematic diagram of apparatus capable of carrying out the present process for illustration of the new and useful method herein.

While this invention is susceptible of embodiment in many different forms, there is shown in the drawing and will herein be described in detail an embodiment of the invention with the understanding that the present disclosure is to be considered as an exemplification of the principles of the invention and is not intended to limit the invention to the embodiment illustrated or described in detail.

Turning first to FIGURE 1, the equipment illustrated schematically is capable of producing heat sealed laminate containers, such as paper plates, in accordance herewith. In the illustrated apparatus, there is provided a supply zone indicated generally 11 for supplying two sheets or webs of material to a cutting zone indicated generally by reference numeral 12, wherein plate blanks are cut and at least peripherally heat sealed for forming finished product plates from the blanks in forming zone 13. The plates are recovered in a product plate recovery zone indicated generally by reference numeral 14 and the remainder of each web or sheet is recovered as a separate by-product in the product trimming or scrap recovery zone indicated generally by reference numeral 15.

Supply zone 11 includes a supply of heat sealable material in the form of polypropylene or polyethylene film coated with a heat sealable coating. Also provided in the supply zone is a supply of sheet material for use as a backing for heat sealing the heat sealable film thereto, the backing material being in the form of paper web stock 21 supplied from a roll. Rolls 20 and 21 are mounted on rollers 22 and 23, respectively, the rollers being rotatably mounted on suitable framework (not shown) in the usual manner.

In cutting zone 12, sheets 20 and 21 are fed or drawn between a pair of opposing rollers 24 providing a gap to dispose sheets 20 and 21 face-to-face with respect to each other. The sheets in face-to-face disposition are passed between a male cutting die 25 and a female cutting die 26. Although only one set of dies 25 and 26 is shown, a plurality of dies, e.g., laterally disposed with respect to each other, would more normally be used with the dies closely spaced with respect to each other across the width of sheets 20 and 21. The male die 25 has an annular peripheral cutting projection 25a and the female die 26 has an annular groove 26a for receiving projection or ridge 25a. Male die 25 is reciprocated downward to a position in which projection 25a is within groove 26a and upward to the position shown as webs 20 and 21 are drawn through between the two dies, in order to effect cutting of generally circular plate blanks from the web material in the usual manner. The illustrated dies are merely exemplary as any other usual dies can be used or adapted for use; e.g., dies 25 and 26 can be generally flat cutting dies eliminating elements 25a and 26a.

Heating means in the form of electrical resistance heating elements or coils 29 is provided for heating die 25 to a temperature sufficient to cause heat sealing of web 20 to web 21 during the cutting operation, die 25 descending upon web 20, heating web 20 to heat sealing temperature, and heat sealing web 20 to web 21 while cutting both webs to form a paper plate blank. Heating coil 29 is supplied with electric current through lines 30 and 31 and variable resistor 32 from a suitable source of electric power indicated by reference numeral 33. Variable resistance or rheostat 32 is provided to vary the temperature of die 25 in accordance with the desired heat sealing temperature. Other heating means such as a heat exchanger in die 25 using hot oil or steam, suitably directed thereto through pipes or other conduits and temperature controlled, can be used.

The trimming 20a and 21a from webs 20 and 21, respectively, and the cut blanks, one of which is indicated by reference numeral 35, leave the cutting zone over roller 34. The cut blank 35 proceeds to forming zone 13 and slides over the top of female forming die 39 until it abuts stop 40 on the lower lip of the inclined female die 39. Male die 41 reciprocates upward and downward in the same manner as die 25 and is coordinated with die 25 in the usual manner so that upon lapse of sufficient time for the blank 35 to be carried from cutting zone 12 to rest on abutment 40, male forming die 41 descends and forms a paper plate or the like from blank 35. Each time male die 41 reciprocates upward, a finger 42 also reciprocates upward and, slightly after the male die leaves female die 39, and pushes the finished formed plate or container 43 from female die 39 over lip 40 and onto a conveyor belt 44, continuously driven by suitable motor means, not shown, for delivering finished plates 43 to a recovery area 14 wherein the plates are stacked on a receiving member or support 45 in the form of a stack 46. Upon formation of the desired number of plates in a stack, the stack may be removed.

Positive release members such as finger 42 may also be provided in male die 41 and in dies 25 and 26 as desired to assure release of the formed article or blank from the dies against suction or friction which may tend to hold the formed plate or blank in a die.

The web trimmings 20a and 21a are recovered in separate rolls 49 and 50 by winding on rollers 51 and 52, respectively. Rollers 51 and 52 are driven in counterclockwise direction, as shown in FIGURE 1, by suitable means such as a motor 53 having its armature linked to rollers 51 and 52 by means of chains 54 and suitable sprockets of conventional configuration. The pulling by motor 53 is used, in the illuhtrated form, as the pulling power for pulling webs 20 and 21 from their respective rolls with roller 22 rotating in counterclockwise direction and roller 23 rotating in clockwise direction.

The supply of material, cutting of plate blanks, and forming of plates, and recovery of plates may be performed by conventional equipment as will be apparent, the heat being applied to the cutting zone as shown, or by other external means. Although heating coil 29 is shown as heating the entire male die 25 to heat seal film 20 to web 21 over the entire area of the blank, heating coil 29 may also alternatively be provided only adjacent or within the annular cutting member 25a to obtain only a peripheral heat seal in a band at the cut periphery of the plate blank. Further heat seal may be achieved as desired by heating male forming die 41 by suitable electrical coil 55 supplied from source 33 through temperature regulating variable resistor 56, or by other heating means as will be apparent to those in the art. In some cases, sufficient heat sealing temperatures may be developed by the operation of male die 41 and female die 39 through friction to effect sufficient subsequent heat sealing after the peripheral heat seal by dies 25 and 26. A blank with only a peripheral heat seal or a blank with a circular or total area heat seal may also be formed by two operations, first heat sealing the band or area and thereafter cutting along the heat seal perimeter, e.g., by two reciprocations of die 25 toward die 26, first bringing die 25 only into heat sealing contact with the webs and thereafter on a subsequent or alternate reciprocation effecting the cutting at the heat sealed band, the travel of webs being stopped between the two reciprocations; also, separate heat seal equipment may be provided to heat seal the circular or peripheral band prior to entry into the cutting dies with means provided, e.g., register marks and photoelectric detections, to register the heat sealed circular band or area with the cutting dies in conventional pattern registry manner.

Generally, the flow of material through the apparatus illustrated in FIGURE 1 and the recovery of product plates, as well as the coordination of the various elements of the system, may all be effected in ways well known to those in the art. In view of the different speed of drawing webs 20 and 21 through the cutting zone 12, motor 53 may be of variable speed with the speed decreasing as rolls 20 and 21 decrease in diameter, and the dies in zones 12 and 13 may be reciprocated at a preset constant rate, or mark register systems employing marks on one or more of webs 20 or 21 read by electric eye or photocell means, may be utilized to coordinate die action with travel of the webs for optimum production of plates on the web, and for minimum trim production.

In the illustrated form, the web trimmings are recovered as rolls 49 and 50, there being sufficient trim between adjacent plate blank cuttings to permit the web to be pulled thereby for supply of web to the cutting zone. Other means of supply and recovery of the web trimmings may be readily adaptable from systems utilizing a single laminated film fed to a cutting zone with recovery of laminated film trimmings thereafter.

Figure 2:
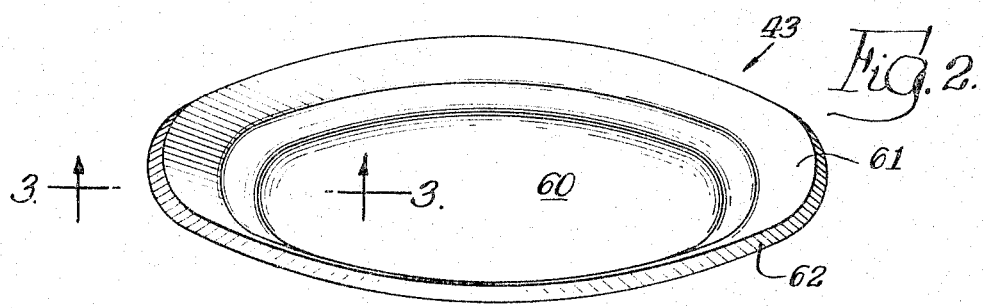
FIGURE 2 is a perspective view of a paper plate made by the process of this invention.
Figure 3:
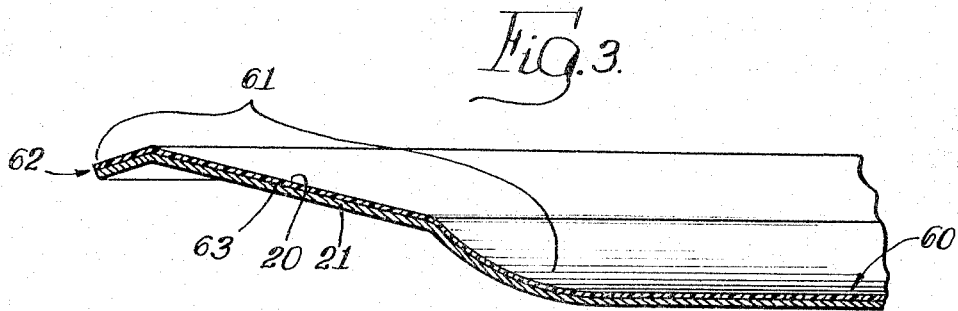
FIGURE 3 is a section through the plate of FIGURE 2 taken along line 3—3 of FIGURE 2.

Turning now to FIGURES 2 and 3, there is illustrated a plate produced by the method of this invention. The plate 43 includes a bottom portion 60 with an upstanding rib or side 61 to give the plate the usual paper plate configuration. In FIGURE 3, the heat seal coating on the polypropylene film 20 is shown generally by line 63 between film 20 and sheet 21 in the formed plate. The edge 62 of the plate corresponds generally to the edge of blank 35 and is the peripheral edge of the plate cut with film 20 in heat sealing state and disposed in heat sealing relation to the paper sheet 21. Film 20 comprises the inner surface of plate 43. After cutting at edge 62, film 20 is permitted to reset from the heat sealing state. Thus, edge 62 is a fusion cut thermoplastic and fibrous material.

The method of this invention is applicable to any plurality, e.g., two or more, sheets of material, which can be heat sealed to form a laminate structure. Thus, at least one of the sheets or webs is heat sealable to an adjacent sheet or web to form the laminate. The preferred heat sealable materials are the heat sealable plastic films, and the preferred backing material is a fibrous sheet such as paper, including cardboard, cloth, or the like. Preferably both sheets are flexible.

Suitable plastic films include the thermoplastic and heat set types, the thermoplastic type being very advantageous and common for use in heat sealing to form paper plates. The plastic films or sheets may be, for example, polyethylene or polypropylene, which may be corona treated, surface oxidized, heat seal coated, or otherwise treated for improved bonding to paper or the like, other normally solid thermoplastic high molecular weight hydrocarbon polymers, i.e., homopolymers or copolymers, etc.

Corona treatment, well known in the art, is an electrical treatment whereby a hydrocarbon polymer such as polyethylene or polypropylene is subjected to an electrical charge by passing the polymer sheet between two electrodes for activating one surface of the sheet. Such treatment improves the ability of the surface of the polyethylene or polypropylene to adhere to adhesives and improves the heat sealability of the surface. Such corona treated film is commercially available, as are films or sheets which have a surface flame treated or chemically etched to provide improved adhesion through oxidation of the surface, which are also usable in accordance herewith.

Such polymers treated for improved heat sealability by surface treating or the like are known to the art. The usable hydrocarbon polymers are generally polymers of low molecular weight ethylenically unsaturated hydrocarbons and include, but are not restricted to, polyethylene, polypropylene, polybutylene, polyisobutylene, the polyhexenes, and copolymers such as copolymers of butylene and isobutylene, butylene and styrene, ethylene and butylene, ethylene and propylene, styrene and ethylene, butylene and propylene, and the like. The preferred hydrocarbon polymers are polyethylene and polypropylene.

Other known heat sealable films also include polyvinyl chloride, polyvinyl chloride-polyvinyl acetate copolymer, nylon, polyvinylidene chloride (e.g., Saran), polyvinyl alcohol, polyvinyl acetate, cellulose acetate, cellulose acetate butyrate, ethyl cellulose, Pliofilm (rubber hydrochloride), chlorinated rubber, polycarbonates, and polymers of vinyl acetal, vinyl alcohol, vinyl carbazole, and the like. Such heat sealable films are well known to those in the art and may be used with or without heat seal materials or surface treatment as is more usual depending on the particular application.

Where it is desired to use a heat sealable coating, often desirable where a hydrocarbon polymer film is used for lamination to paper backing, the usual heat sealable materials are applicable. Examples of suitable heat seal materials include the nonhydrocarbon polymers indicated above and the copolymers of hydrocarbon monomers and nonhydrocarbon monomers, which may be conventionally deposited on the surface of the thermoplastic hydrocarbon film as a heat seal coat, from solution, or the like. As a particular example, the solution of 12 parts by weight ethylene-vinyl acetate copolymer, 4 parts paraffin wax, and 10 parts modified phenolic resin (Union Carbide BR–254) in 74 parts toluol, has been found suitable as a heat seal coating for polyethylene and polypropylene films.

As described above, the heat sealing and cutting of the blanks in accordance herewith is carried out at a temperature in the heat sealing temperature range of the particular heat sealable film used. Such temperatures are well known to those in the art. For example, where polyethylene is used as film 20 in the illustrated process, a die temperature in the range of about 180 to 250° F. would normally be used. Where a heat seal coating is used on the polyethylene film, the temperature may be somewhat different; such temperatures are also well known to those in the art. For example, where the particular ethylene-vinyl acetate copolymer heat seal coating described above is used on a polyethylene or polypropylene film, the temperature of cutting and heat sealing would normally be in the range of about 275 to 300° F. The heat seal coatings or adhesives may include, a further exemplification, the natural and synthetic resin adhesives such as rubber and hydrocarbon resin base adhesives as well as the urethane and epoxy adhesive compositions. Modifying agents may be added to the adhesives as desired; for example, the adhesive may contain agents or ingredients rendering the adhesive more readily applicable to the film by printing techniques and/or ingredients for enhancing adhesion to inked surfaces. Such agents or ingredients are usually used in small or minor amounts based on total adhesive composition.

The heat seal material may be applied to the film as a liquid, e.g., as a solution or as an aqueous dispersion, and need not necessarily be dried before feeding the film to the heat sealing and cutting step of the present process. Rotogravure printing techniques are applicable for providing heat seal material on the film surface.

Preferably the surfacing film is transparent and can be reverse-printed to provide a colorful design and thereafter heat seal coated over the printing for use in manufacture of paper plate blanks in accordance herewith. Alternatively, the film may be reverse-printed and the heat seal coating may be put on the backing web, e.g., paper, and the heat seal operation, as described herein, thereafter conducted with the two webs facially disposed with respect to each other. Also, in lieu of a true heat seal material, an adhesive which is not a good heat seal but is rather merely an adhesive material may be applied wet and the bond between the webs may be effected by subsequently bringing the webs together, e.g. under the pressure of the cutting dies. As another alternative for bonding the webs at the periphery of the blank or other article to be cut from the webs, the dies may be designed to give a good friction bond as by crimping or undulating or perforating the peripheral portions of the article configuration on the webs to secure the webs to each other.

Where using a heat seal coating, the coating may be pre-applied to the paper surface just as well as the film surface and may be dried prior to use. Where a total surface between the webs is to be coated, it may be advantageous to coat the paper rather than the film so that the plastic film trimmings are free from coating for more advantageous scrap recovery.

I claim:

1. A method of forming a heat sealed laminate of a desired shape which comprises providing separate supplies of a first web and a second web, said second web being heat sealable to said first web, feeding and directing said first and second webs from said supplies to a cutting station while disposing said webs in facing relation with each other, cutting through both said first and second webs at said station at a portion defining the perimeter of the desired shape while heat sealing said portions of said webs together, recovering the resulting cut-out laminate of the desired shape, and recovering from said station trimmings of said two webs exteriorly of said perimeter as separate products.

2. A method of forming a bonded laminate material of predetermined shape, which method comprises providing separate supplies of a first web and a second web, said second web being bondable to said first web, feeding and directing said first and second webs from said supplies to a cutting station while disposing said webs in facing relation with each other, bonding a portion of said first web to a corresponding portion of said second web to define the perimeter of the predetermined shape, cutting through both said first and second webs along said perimeter while said second web is being bonded to said first web, recovering the cut-out shape defined by said perimeter as the product laminate material, and recovering the second web trimmings from the cutting station as a product separate from the first web trimmings.

3. The method of claim 1 wherein said heat sealable web is selected from the class consisting of polypropylene and polyethylene films.

4. The method of claim 1 wherein the second web is a transparent plastic film and including the step of applying a coating of heat sealable material to the side of said heat sealable web to face said first web prior to said heat sealing and cutting.

5. The method of claim 1 wherein said heat sealable first web is selected from the class consisting of polypropylene and polyethylene films and including, prior to said heat sealing and cutting, the step of corona treating the surface of said film facing said first web.

6. The method of claim 1 including the step of heat sealing the total area of said two webs within said perimeter.

7. The method of claim 1 wherein said heat sealing step consists essentially of heat sealing a narrow band along said perimeter and including the additional separate step of heat sealing said webs together over the total surfaces thereof within said perimeter while forming the cut-out laminate to the shape of a container with the plastic film forming the container inside surface.

8. A method of forming a laminate paper plate which comprises disposing a first web and a second web in facing relation with each other, said second web being heat sealable to said first web, heat sealing an area of said second web to a corresponding area of said first web, said areas being defined generally by the perimeter of a generally circular blank of configuration for forming the desired paper plate, cutting the blank from said first and second webs along said perimeter while in heat sealable state, and die pressing the resulting blank to the configuration of a paper plate having a bottom and an upstanding peripheral wall with the inner surface of said bottom and wall comprising said heat sealable web, recovering said container as a product from the method and recovering and separating trimmings of said two webs exterior of said perimeter as separate products.

9. A method of forming a laminate paper plate which comprises disposing a first sheet and a second sheet in facing relation with each other, said second sheet being heat sealable to said first sheet, cutting said facing first and second sheets along a perimeter of a desired paper plate blank while heat sealing said sheets together in the area defined by said perimeter, forming the resulting blank cut out by cutting at said perimeter to the configuration of a plate having a bottom and an upstanding wall with the inner surface of said bottom and wall comprising each heat sealing sheet and recovering trimmings of said two sheets exterior of said perimeter as separate products.

10. A method of making a plastic and paper laminate plate from a first roll stock web of paper and a second roll stock web of heat sealable plastic film which method comprises unwinding web from each of said rolls, disposing one web face-to-face with the other, heat sealing an area defining the perimeter of a plate blank while concurrently cutting the plate blank from the faced webs along said perimeter from the plastic web surface of the faced webs, forming the resulting disc-shaped blank to the configuration of a paper plate, recovering the resulting paper plate and recovering and separating paper and film trimmings from said webs.

11. The method of claim 10 wherein the heat sealable web is a film of thermoplastic material and the other web is an absorbent fibrous sheet.

12. The method of claim 11 wherein said plastic film is corona treated polyethylene and said heat sealing and cutting is at a temperature of said film in the range of 180 to 250° F.

13. The method of claim 11 wherein said heat sealable web is a heat seal coated plastic film and the other web is paper.

14. The method of claim 13 wherein said heat seal coated plastic film is a polypropylene film coated with a toluene solution of a composition comprising a major proportion of ethylene-vinyl acetate copolymer and a minor amount of paraffin wax.

References Cited by the Examiner

UNITED STATES PATENTS

| | | | |
|---|---|---|---|
| 2,014,815 | 9/1935 | Rutledge | 93—36 |
| 2,153,351 | 4/1939 | Steinberger | 156—251 |
| 2,482,981 | 9/1949 | Kamrass | 156—269 |
| 2,797,179 | 6/1957 | Reynolds et al. | 156—224 |
| 2,833,685 | 5/1958 | Lawrence | 156—224 |
| 3,020,186 | 2/1962 | Lawrence | 156—251 |
| 3,028,576 | 4/1962 | Gerard | 156—515 |
| 3,032,463 | 5/1962 | Morgan | 156—267 |
| 3,067,921 | 12/1962 | Reifers | 229—2.5 |
| 3,067,922 | 12/1962 | Hill | 229—2.5 |

EARL M. BERGERT, *Primary Examiner.*

JAMES R. GARRETT, DOUGLAS J. DRUMMOND, *Examiners.*

J. L. KRUTER, *Assistant Examiner.*